United States Patent [19]

Maehara

[11] 4,102,959
[45] Jul. 25, 1978

[54] PROCESS FOR PREPARING FILM BY WET METHOD

[75] Inventor: Junichiro Maehara, Sodegaura, Japan

[73] Assignee: Idemitsu Kosan Company, Ltd., Tokyo, Japan

[21] Appl. No.: 785,436

[22] Filed: Apr. 7, 1977

Related U.S. Application Data

[63] Continuation-in-part of Ser. No. 701,795, Jul. 1, 1976, abandoned.

[30] Foreign Application Priority Data

Jul. 31, 1975 [JP] Japan .................. 50/92535

[51] Int. Cl.² .......................... B05D 3/00; D02G 3/22
[52] U.S. Cl. .................. 264/41; 210/500 M; 264/184; 264/202
[58] Field of Search ........... 425/68, 86; 264/180, 264/168, 200, 208, 130, 143, 183, 184, 188, 182, 216, 202; 264/41, 182; 210/500 M

[56] References Cited

U.S. PATENT DOCUMENTS

| | | | |
|---|---|---|---|
| 1,119,155 | 12/1914 | Hartogs | 264/130 |
| 1,910,879 | 5/1933 | Bernstein | 425/68 |
| 2,004,272 | 6/1935 | Dreyfus | 264/190 |
| 2,004,273 | 8/1935 | Dreyfus | 264/208 |
| 2,199,882 | 5/1940 | Inokushi et al. | 264/180 |
| 2,708,617 | 5/1955 | Maget et al. | 425/68 |
| 3,068,527 | 12/1962 | Morgan | 264/143 |
| 3,674,628 | 7/1972 | Fabre | 264/182 |
| 3,888,771 | 6/1975 | Isuge et al. | 264/41 |
| 3,930,105 | 12/1975 | Christen et al. | 264/41 |
| 3,975,478 | 8/1976 | Leongva | 264/41 |

OTHER PUBLICATIONS

Seni Gakaishi, vol. 15, No. 12, pp. 951–959, Dec. 1959, "Study an Acrylic Fiber (VII).
Fasertovschung und Textlitechnik 10, (1959), pp. 214–224.

Primary Examiner—Jay H. Woo
Attorney, Agent, or Firm—Flynn & Frishauf

[57] ABSTRACT

This invention relates to a process for preparing a film having asymmetric cross-sectional structure by wet method. Films with excellent properties can be obtained by feeding the starting solution to the interface area of two phases of the coagulation bath to make said solution into a gel.

18 Claims, 1 Drawing Figure

U.S. Patent  July 25, 1978  4,102,959
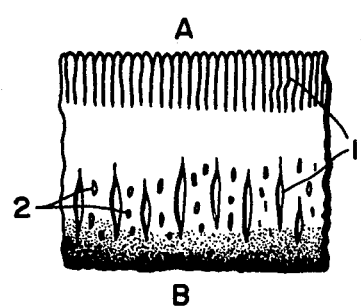

PROCESS FOR PREPARING FILM BY WET METHOD

RELATED APPLICATION

This application is a continuation-in-part of application Ser. No. 701,795, filed July 1, 1976.

BACKGROUND OF THE INVENTION (a) Field of the Invention

The present invention relates to a process for preparing film by wet method, using a coagulation bath consisting of two kinds of liquids which form two phases.

(b) Description of the Prior Art

Reverse osmosis method is widely applied for purification, concentration, separation, etc., of a substance. In performing this method, it is essential to use an asymmetric film the structure of which is different between its surface and backside.

Heretofore, said film was prepared by a casting process which comprises coating a starting solution on a glass plate and forming a film by evaporating solvent gradually. For instance, Loeb film for converting sea water into fresh water can be obtained by the process of coating a dope solution consisting of cellulose acetate in such a good solvent as acetone or dioxane and a swelling agent (water or formamide) on the plate to make a layer of appropriate thickness, evaporating the major part or all of the solvent at a lower temperature, eluting the swelling agent and the residual solvent if any by immersing said layer and heating the layer at a temperature of 70° to 90° C.

However, on performing this casting process, heat treatment must be done under a temperature of lower than 80° C. since an excellent film cannot be obtained by treatment at a higher temperature. Thus, a solvent applicable for the process is restricted and also the starting solution is restricted.

SUMMARY OF THE INVENTION

An object of this invention is to provide a process for preparing film having an asymmetric cross-sectional structure by wet method. According to the invention, the starting solution for a film is fed to an interface area of two liquid phases in a coagulation bath. At least one of the two liquids has a sufficient coagulating ability to make the starting solution into a gel.

According to the present invention, such phenomena as sedimentation or flotation of the starting solution can be prevented.

BRIEF DESCRIPTION OF THE DRAWING

The FIGURE shows a cross-sectional view of a film produced by the process of this invention. In the FIGURE, A is the face of the ethyl acetate side, B is the face of the water side, 1 is capillary and 2 is micro void.

DETAILED DESCRIPTION OF THIS INVENTION

The present invention provides a process for preparing a film having an asymmetric cross-sectional structure by wet method, which comprises feeding a starting solution for a film to an interface area of two liquid phases in a coagulation bath, where the two liquid phases are not miscible with each other and at least one of the two has a sufficient coagulating ability to make the starting solution into a gel.

According to the present invention, such phenomena as sedimentation or flotation of the starting solution can be prevented and moreover, this invention has an advantage in that dispersion into the coagulation bath of fine gelated precipitates, which do not participate in forming a film, can also be prevented.

Examples of starting solutions for films are an aqueous solution of cellulose sodium xanthogenate for rayon film; acetone or methylene chloride solution of cellulose acetate for cuprammonium rayon film; rhodanate, nitrate, N,N-dimethylformamide, N,N-dimethylacetoamide, dimethylsulfoxide or acetone solution of polyacrylonitrile for acrylic film; aqueous, alcohol or urea solution of polyvinyl alcohol for vinylon film; acetone-carbon disulfide or acetone-benzene solution of polyvinyl chloride for polyvinyl chloride film; N,N-dimethylformamide, N,N-dimethylacetoamide or dimethylsulfoxide solution of polyurethane for polyurethane film; aqueous alkaline or dimethylsulfoxide solution of soy casein, milk casein or yeast protein for proteinous film; and methylene dichloride solution of poly(L-glutamate-γ-methyl) or aqueous solution of poly(L-sodium glutamate) for polyamino acid film. Moreover, mixtures of above-described starting solutions comprising two or more kinds of components can also be employed in the present invention. Furthermore, the starting solution of a natural fiber being grafted with a polymeric substance or synthetic graft-polymer or block-copolymer can also be employed for preparation of films of this invention.

As a coagulation bath in the present invention, there is a mixed system of two kinds of liquids that are not miscible with each other and form an interface area due to separation into two phases. At least one of the two is required to possess sufficient coagulation ability to cause gelation of the starting solution for film. Furthermore, it is possible to add additives for increasing or decreasing coagulation ability, solvents for adjusting specific gravity or soluble materials to the above coagulation bath as required.

On forming a coagulation bath, it is possible to make either or both the upper or lower phase the coagulation phase.

Generally, as a measure of coagulation ability, it is common to express amount of coagulation agent required for forming white precipitates by dropwise addition of said coagulation agent to the starting solution for film as a so-called "coagulation value." The smaller the coagulation value, the greater the coagulation ability, and the value will vary depending on the combination of the starting material, solvent and coagulant.

Sufficient coagulation ability for causing gelation described in the present invention means a coagulation value below 30, preferably below 20. That is, in order to achieve the object of preventing phenomena of sedimentation or flotation of viscous clumps in the coagulation bath in the wet method in the present invention, it is sufficient that either the upper or lower phase have a coagulation value of below 30, preferably below 20. However, in order to achieve an object of the present invention, that is, rapid formation of film with well developed asymmetric cross-sectional structure and strength, it is advantageous to use a combination of the upper and lower phases with remarkably different coagulation values, for example, one coagulation value is more than 30 and the other value is below 10.

As described in the foregoing sections, phenomena of sedimentation or flotation of viscous clumps in the coagulation bath in the wet method occur in the early stage where gelation of the starting solution for film has not progressed as yet, and thus these phenomena occur as a result of a relationship between the specific gravity of the starting solution for the film and that of the coagulation solution. That is, in general in a region where the specific gravity of the coagulation solution is smaller than that of the starting solution for the film, sedimentation will occur and, in a region where the specific gravity of the coagulation solution is greater than that of the starting solution for the film, flotation will occur, although these phenomena may vary depending on the coagulation ability in some parts. Therefore, in order to prevent sedimentation or flotation, it is necessary to employ a coagulation bath comprising a combination of an upper phase having a specific gravity ($G_1$) smaller than that ($G_O$) of the starting solution for the film and a lower phase having a specific gravity ($G_2$) greater than $G_O$. However, since kinetic factors, i.e., diffusion of coagulant into a formed film and diffusion of solvent of said formed film into the coagulation solution, are related to the gelation, coagulation ability of the coagulation solution has an effect on the practical process for forming of film. Generally, in a coagulation solution of greater coagulation ability such as water or formic acid, diffusion of coagulation solution into a formed film occurs predominantly, while in a coagulation solution with comparatively smaller coagulation ability such as higher aliphatic alcohols, polyalcohols or aromatic hydrocarbons, diffusion of solvent of a formed film into the coagulation solution occurs predominantly. Therefore, even when $G_1$ is greater than $G_0$, rapid gelation of a formed film that is about to float will occur and at the same time the coagulant in the upper phase with greater coagulation ability predominantly diffuses into the formed film if coagulation ability is sufficiently high. And thus, the specific gravity of the formed film increases quickly to that of the upper phase; subsequently, desired formation of film can be attained while preventing flotation.

Even when $G_2$ is smaller than $G_0$, the sedimentation phenomenon will be prevented for reasons described above, if coagulation ability of the lower phase is sufficiently high.

Accordingly, in the present invention it is necessary to select each component of the coagulation solution to satisfy a prescribed relationship of $G_0$ and $G_1$, and of $G_0$ and $G_2$. In the following sections, relationships between these specific gravities and coagulation ability are described. $P_1$ and $P_2$ means coagulation values for the upper phase and the lower phase, respectively.

(A) $G_2 < G_1 \geqq G_0$

In this case, $P_1 \leqq 20 \leqq P_2$, preferably $P_1 \leqq 10$ and $P_2 \geqq 30$ must be satisfied. Examples of combinations to satisfy the above relationship are as follows: combination of such an upper phase as a ketone (acetone, methylethyl ketone, diethyl ketone, etc.); tetrahydrofuran; organic acid (formic acid, acetic acid, etc.); aldehyde (formaldehyde, acetoaldehyde, etc.); etc.; a lower phase such as glycerin or a derivative thereof; and a starting solution for film such as a proteinous solution of casein, yeast protein, etc., a solution of vinylon film or a solution of a polyvinyl film; and a combination of an upper phase such as water; a lower phase such as a halogenated benzene (monochlorobenzene, o-, m- or p-dichlorobenzene, 1,2,4-trichlorobenzene, etc.); and a starting solution for a film such as an acrylic solution.

(B) $G_0 \geqq G_2 > G_1$

In this case, $P_2 \leqq 20 \leqq P_1$, preferably $P_2 \leqq 10$ and $P_1 \leqq 30$ must be satisfied. Examples of combinations to satisfy this relationship include: a combination of an aliphatic hydrocarbon such as n-heptane, isopentane, etc.; liquid paraffin; ligroin; kerosene, etc.; an organic acid ester such as methyl acetate, ethyl acetate, butyl acetate, dibutyl phthalate, etc.; and an aromatic hydrocarbon such as benzene, toluene, o-xylene, p-xylene, etc., as the upper phase; water as the lower phase; and a solution of viscose rayon or rayon, cuprammonium rayon, acrylate or vinylon as the starting solution for the film. Other examples are as follows: a combination of glycerin or a derivative thereof as the upper phase; a halogenated organic acid such as monochloroacetic acid, dichloroacetic acid or trifluoroacetic acid as the lower phase; and a polyamino acid solution as the starting solution for the film; a combination of an organic acid ester such as methyl acetate, ethyl acetate, butyl acetate, dibutyl phthalate, etc., and an aromatic hydrocarbon such as benzene, toluene, o- or p-xylene as the upper phase; a diamine such as hydrazine, ethylene diamine, hexamethylene diamine, etc., as the lower phase; and a polyurethane solution or polyurethane copolymer such as protein grafted with polyurethane as the starting solution for the film.

(C) $G_2 \geqq G_0 \geqq G_1$

In this case, $P_1 \leqq 20 \leqq P_2$, preferably $P_1 \leqq 10$ and $P_2 \leqq 30$, or $P_2 \leqq 20 \leqq P_1$, preferably $P_2 \leqq 10$ and $P_1 \geqq 30$ must be satisfied. Examples satisfying this relationship are shown in (A) and (B).

The process for preparing film with a batch-wise process can be operated as follows: (a) feeding the starting solution for the film to an interface area of two liquid phases in a coagulation bath; (b) feeding the starting solution for the film to the lower liquid phase in the bath and then introducing the upper liquid phase immediately; or (c) feeding the starting solution for the film to the upper liquid phase in the bath and then introducing the lower liquid phase immediately. When performing the above-described process (b), the upper liquid phase is added to the lower liquid phase in an amount sufficient to cover the starting solution prior to feeding of the starting solution, and is introduced in a predetermined amount after feeding of the starting solution. Similarly, when performing the above process (c), the lower liquid phase is added to the upper liquid phase in an amount sufficient to cover the bottom of the bath and the residual amount of the lower liquid phase is added after feeding of the starting solution.

When the process of this invention is carried out as a continuous process, it is preferable to feed the starting solution for film to an interface area of two liquid phases in a coagulation bath, have the resulting film travel in the interface area through the coagulation bath, and reel the film therefrom.

As a nozzle for preparation of a film, a nozzle with slits is generally preferable. Space between slits in the edge should be made rather narrow in order to prevent formation of a so-called "film edge", i.e., a phenomenon wherein film becomes thick in both of its edges.

The film obtained by the process of this invention can have such post-treatments as drying, heat-treatment, stretching, etc. Further, the film is treated with conditioning using two phases of treating solution having a composition different from those of the coagulating solution, if desired.

According to the process of this invention, a film having asymmetric cross-sectional structure can be obtained, since the difference in dense and sparse structure occurs between the surface and backside of the film formed due to the difference in coagulation ability between the upper phase and the lower phase of the coagulation bath. Thus, the film obtained is useful as a film for reverse osmosis and for filtration. The formation of "film edge" can be prevented by using a "ring-die" which has a ring type-emerging part. In this case, it is preferred to set the direction of emergence of the starting solution and the direction of formation of film to upper and downward perpendicularly. Two liquid phases of the coagulating solution are fed from the inner and outer side of the starting solution for film which is introduced cylindrically.

The present invention is described in detail by means of the following examples and comparative examples.

EXAMPLE 1

Ten parts by weight of a commercially available polyacrylonitrile fiber (Patria: extremely fine, yarn for handicraft, acryl 100%) were dissolved in 90 parts by weight of dimethylsulfoxide by stirring them at room temperature. The starting solution for the film had a specific gravity of 1.10. It was allowed to stand for one day to remove gas.

To a 100 liter content vessel (length: 2 meters, distance from nozzle to the outlet: 170 centimeters), 30 liters of ethyl acetate (specific gravity: 0.90, coagulation value: 67.8) were placed as the upper phase of a coagulation solution and 30 liters of water (specific gravity: 1.00, coagulation value: 8.3) as the lower phase. In the interface area of the above coagulation solution (15° C.), the above starting solution emerged through a nozzle installed at one end of the vessel. The nozzle has a slit of 50 millimeters in width and 0.2 millimeter in height at the conditions of: driving pressure, 1.0 kg/cm$^2$; maximum reeling rate, 32.0 meter/minute; and draft rate, 4.8. the resulting film was reeled. This operation was continued for 6 hours and it was confirmed that film formation can be done stably.

Film thus obtained was drawn at a drawing rate of 1.2 in a second bath (95° C.) comprising an aqueous solution of 70 weight percent of dimethylsulfoxide, and then dried at 80° C. after treatment with heated steam (110° C.). By these procedures, a white opaque film of 0.04 millimeter in average thickness was obtained.

The resulting film was dipped into an aqueous solution containing Malachite Green (1 weight percent) and Congo Red (1 weight percent) at room temperature (about 20° C.) for 30 minutes. Thereafter, the film was washed with water and dried with air. The difference of the degree of dyeing between surface and backside of the film was measured.

As a result, it was confirmed that the coagulation agent was dyed lightly on the water side and deeply on the ethyl acetate side. Thus, the inner and the outer structures of the film differed from each other.

Further, a part of the film was dipped into acetone and then into water. Thereafter, the film was frozen at $-30°$ C. The frozen film was cut into slices with a microtome. The sectional structure was observed by optical microscope.

The FIGURE shows the cross-sectional view of the film. It was found from the figure that the structure of the film is asymmetric on both sides. In the figure, A is the face of the ethyl acetate side, B is the face of the water side, 1 is capillary and 2 is micro void.

It is considered from the FIGURE that a dense surface layer was formed and water was diffused into the inner portion which did not progress to gelation and formed micro cavities which are so-called "micro voids" and also macro cavities which are so-called "capillaries", because the coagulation ability of water which was related mainly to the coagulation at the lower side of the film is substantially higher.

Further, it is considered that a structure with uniform capillaries was formed at the ethyl acetate phase because the coagulation ability of ethyl acetate is lower than that of water and thus, the starting solution gelated gradually.

Simultaneously, it is considered that a structure with uniform smaller capillaries was formed because the solvent, dimethyl sulfoxide, was diffused from the inner portion to the ethyl acetate phase during gelation.

COMPARATIVE EXAMPLE 1

Using an aqueous solution of 50 weight percent of dimethylsulfoxide (specific gravity: 1.05; coagulation value: 17.8) as the coagulation solution, the same starting solution as shown in Example 1 was made into film under the conditions of: driving pressure, 0.8 kg/cm$^2$; maximum reeling rate, 19.6 meters/minute; and draft rate, 2.5. Film thus obtained had a homogeneous cross-sectional structure.

COMPARATIVE EXAMPLE 2

Using only ethyl acetate as the coagulation solution, the same starting solution as shown in Example 1 was made into film. In this case, the starting solution extruded from the nozzle ran down to the bottom of the coagulation bath at the vicinity of the nozzle and solidified to make clumps. This phenomenon could not be prevented, although the formation of film was repeated under various conditions such as modifying the feeding rate of the starting solution, etc.

COMPARATIVE EXAMPLE 3

Using only water as the coagulation solution, the same starting solution as shown in Example 1 was used to make a film under the conditions of: driving pressure, 1.0 kg/cm$^2$; maximum reeling rate, 7.6 meters/minute; and draft rate, 0.97. Film thus obtained was very fragile and it was very difficult to make it in a continuous reeling operation.

EXAMPLE 2

Ten parts by weight of commercially available Spandex fiber (DuPont, 70 denier) were added to N,N-dimethylacetoamide (90 parts by weight) and stirred at 90° C. to make a complete solution. It was then cooled to 40° C. The starting solution (specific gravity: 0.94) was thus obtained.

Keeping the coagulation bath at 20° C. which contained p-xylene (specific gravity: 0.86; coagulation value: 56.0) as the upper phase and hydrazine hydrate (specific gravity: 1.04; coagulation value: 6.3) as the lower phase, the above-described starting solution was made into a film under the conditions of: driving pressure, 1.2 kg/cm$^2$; maximum reeling rate, 12.9 meters/- minute; and draft rate, 3.2. Film thus obtained had asymmetric cross-sectional structure.

COMPARATIVE EXAMPLE 4

Using a uniform system comprising equal amounts of hydrazine hydrate and ethylene diamine (specific gravity: 1.02; coagulation value: 23.3) as the coagulation solution, the same starting solution as described in Example 2 was made into a film. The starting solution extruded from the nozzle floated towards the surface of the coagulation solution in an early stage where gelation did not progress at the vicinity of the nozzle. This solution was cut into pieces and parts of the pieces were developed as membranes on the surface and solidified. In this case, a typical flotation of the starting solution was observed. Formation of film was repeated under various conditions such as feeding rate of the starting solution, etc., but the above-described flotation was not prevented. By these procedures, the desired film was not obtained.

EXAMPLE 3

According to the method described in Example 1 of Japanese Laid Open Patent Gazette No. 85210/1974, 10 parts by weight of a grafted copolymer of yeast protein and polyurethane were added to 90 parts by weight of dimethylsulfoxide and stirred at 140° C. to dissolve them. They were left to cool to 50° C. A starting solution with a specific gravity of 0.96 was obtained.

To a 500 milliliter content flask made of glass, hydrazine hydrate (specific gravity: 1.04; coagulation value: 6.6; temperature: 30° C.) was placed in an amount sufficient to cover the bottom of the flask and then 100 milliliters of toluene (specific gravity: 0.87; coagulation value: 58; temperature: 30° C.) were added. The above-described starting solution was fed gently with an injector in an amount sufficient to spread about ⅔ part of the interface area formed by the above two liquid phases, and then 100 milliliters of hydrazine hydrate were added quickly but gently with the injector to the bottom of the flask.

Film in the course of gelation was maintained stably at the interface area of toluene and hydrazine hydrate. After being allowed to stand for one day at room temperature, the formed film was dipped into three baths comprising hydrazine and water in a ratio (by volume) of the former to the latter of 90 to 10, 70 to 30 and 50 to 50, each for one day, respectively, and washed with water followed by drying with air.

A part of the film was dyed with Malachite Green and Congo Red by the same manner as described in Example 1. The degree of dyeing in both faces of the film was compared. As a result, it was confirmed that the coagulation agent was dyed lightly at the hydrazine side and deeply at the toluene side. Thus, the inner and the outer structures of the film differed from each other.

EXAMPLE 4

Ten parts by weight of cellulose triacetate were added to 90 parts by weight of methyl acetate and were dissolved completely at 50° C. By cooling the thus obtained solution to 15° C., a starting solution of specific gravity of 0.94 was prepared.

Using a coagulation bath (15° C.) comprising butyl acetate (specific gravity: 0.88; coagulation value: 37.4) as the upper phase and a mixture of water and isopropyl alcohol (mixing ratio of 7:3 by weight; specific gravity: 0.94; coagulation value: 4.5) as the lower phase, the starting solution described above was fed continuously to the interface of the bath. Film was formed under the conditions of: driving pressure, 1.7 kg/cm$^2$; maximum reeling rate, 21.5 meters/minute; and draft rate, 3.9. By these procedures, the desired film having asymmetric cross-sectional structure was obtained continuously at high speed.

EXAMPLE 5

Ten parts by weight of commercially available polycarbonate (Idemitsu Petrochemical Co., Ltd., Trade Name: Teflon A-3000) were added to dioxane (90 parts by weight) and stirred at 50° C. to make a complete solution. The resulting solution was allowed to cool to 15° C. The starting solution was thus obtained.

Keeping the coagulation bath at 15° C. which contained water (specific gravity: 1.0; coagulation value: 9.2) as the upper phase and a 1:1 mixture (by weight) of dichloromethane and isopropanol (specific gravity: 1.06; coagulation value: 23.2) as the lower phase, the above described starting solution was fed to the interface of the coagulation bath and was made into film under the conditions of: driving pressure, 1.4 kg/cm$^2$; maximum reeling rate, 19.3 meters/minute; and draft rate, 4.2. Thus, an asymmetric film the structure of which differed on both sides was obtained.

EXAMPLE 6

Ten parts by weight of a styrene-rubber block-copolymer (Shell Co., Ltd., Trade Name: Califlex 3202) were added to tetrahydrofuran (90 parts by weight) and boiled to make a complete solution. It was then allowed to cool to 15° C. The starting solution (specific gravity: 0.89) was thus obtained.

200 ml. of water (specific gravity: 1.00; coagulation value: 7.8) and 200 ml. of p-xylene (specific gravity: 0.85; coagulation value: 52.0) were put in a 500 ml. porcelain vat and two phases formed.

Subsequently, the above described starting solution was fed slowly to the interface of the two phases with an injector. In this case, it was observed that the above described starting solution spread in the interface of the two phases.

The film which formed was dipped into four baths, that is, baths comprising p-xylene and acetone in a ratio (by volume) of the former to the latter of 90 to 10, 70 to 30, 50 to 50 and 0 to 100, each for one day, respectively, and then dried with air.

The film obtained was further dipped into an aqueous solution of 2 weight percent of osmium oxide at room temperature for one hour. After washing with water, the degree of dyeing on both faces of the film was compared. As a result, it was observed that the coagulation agent was dyed deeply to black at the p-xylene side and lightly at the water side.

EXAMPLE 7

Ten parts by weight of commercially available collagen (Wako Junyaku Co., Ltd.) were added to an aqueous solution of 0.05 weight percent of acetic acid (90 parts by weight) and made into a complete solution at 60° C. and then allowed to cool to 15° C. The starting solution was thus obtained.

A coagulation solution comprising methyl acetate (specific gravity: 0.94; coagulation value: 44.7) as the upper phase, and an aqueous solution of 0.5 weight percent of sodium chloride (specific gravity: 1.02; coagulation value: 6.6) as the lower phase was put into a 500 milliliter porcelain vat. Subsequently, the above described starting solution was fed slowly to the interface of the two phases with an injector, and then the coagulation system was left to stand for one day.

Further, the film thus obtained was dipped into an aqueous solution of 0.2 weight percent of methyl acetate, an aqueous solution of 0.1 weight percent of sodium chloride and pure water, each for one day, respectively. Then, a part of the film was dipped into a saturated aqueous solution of uranyl acetate for 1 hour. As a result, it was observed that the coagulation agent was dyed to dark yellow at the surface of the methyl acetate side and to pale yellow at the surface of the sodium chloride side.

Further, it was confirmed by the observation of a super slice made from a part of the dyed film by using an ultra microtome with an electron microscope that the film has asymmetric inner texture and surface structure at both its sides.

EXAMPLE 8

Ten parts by weight of a commercially available polyamide hollow fiber (DuPont, Trade Name: B-10) were added to 90 parts by weight of dimethyl acetamide and made into a complete solution at 80° C. and then allowed to cool to 40° C. Thus, the starting solution (specific gravity: 0.94) was prepared. coagulation bath (20° C.) containing methyl acetate (specific gravity: 0.93; coagulation value: 30.3) as the upper phase, and hydrazine hydrate (specific gravity: 1.04; coagulation value: 6.6) as the lower phase. The procedure is as follows: hydrazine hydrate (100 milliliters) was put into a 500 milliliter glass flask and then methyl acetate was added in an amount to reach about 2 millimeters in depth.

Thereafter, the above starting solution was fed gently to the interface of the two phases with an injector. Subsequently, 100 milliliters of methyl acetate were added carefully, and the coagulation system was left to stand for one day.

The film thus obtained was dipped into mixed solutions of hydrazine hydrate and water in the ratios (by volume) of 90 to 10, 70 to 30 amd 50 to 50 and pure water at room temperature, each for one day, respectively.

A part of the film containing water was frozen to $-30°$ C. and made into slices by the use of a microtome. The sectional structure of the film was observed with a photo microscope.

As a result, it was confirmed that dense surface structure and inner porous structure containing capillaries and micro voids existed at the hydrazine side of the film. On the other hand, it was confirmed that fine capillary structure which is perpendicular to the surface of the film and which is developed orderly existed at the methyl acetate side of the film.

What is claimed is:

1. A process for preparing a film having asymmetric cross-sectional structure by wet method from a starting solution for a film, which comprises:

forming a coagulation bath containing an upper liquid phase and a lower liquid phase, said liquid phases being immiscible with each other, defining an interface area with each other, and at least one of the two liquid phases having a sufficient coagulating ability to make the starting solution into a gel, feeding the starting solution for film to said interface area in the bath, and forming the starting solution into film in the course of traveling in the interface area through the coagulation bath, the relationship between coagulating values and specific gravities of said liquid phases and the specific gravity of said starting solution being (A) $G_2 > G_1 \geqq G_0$ when $P_1 \leqq 20 \leqq P_2$, (B) $G_0 \geqq G_2 > G_1$ when $P_2 \leqq 20 \leqq P_1$, and (C) $G_2 \geqq G_0 \geqq G_1$ when $P_1 \leqq 20 \leqq P_2$, wherein
$G_0$ is the specific gravity of the starting solution,
$G_1$ is the specific gravity of the upper of said two liquid phases in said bath,
$G_2$ is the specific gravity of the lower of said two liquid phases in said bath,
$P_1$ is the coagulation value of said upper phase, and
$P_2$ is the coagulation value of said lower phase.

2. The process of claim 1, wherein the film is formed in the interface area, travels in the interface area through the coagulation bath, and is reeled therefrom.

3. The process according to claim 1, wherein either the upper or the lower phase of the coagulation bath has a coagulation value of below 30.

4. The process according to claim 1, wherein the upper or the lower phase of the coagulation bath has a coagulation value of more than 30, and the other phase has a coagulation value of below 10.

5. The process according to claim 1, wherein the said starting solution comprises a polyacrylonitrile, the coagulation bath comprises ethyl acetate (specific gravity: 0.90; coagulation value: 67.8) as the upper phase, and water (specific gravity: 1.00; coagulation value: 8.3) as the lower phase.

6. The process according to claim 1, wherein the said starting solution comprises a polyurethane, the coagulation bath comprises p-xylene (specific gravity: 0.86; coagulation value: 56.0) as the upper phase, and hydrazine hydrate (specific gravity: 1.04; coagulation value: 6.3) as the lower phase.

7. The process according to claim 1, wherein the said starting solution comprises a grafted copolymer of yeast protein and polyurethane, the coagulation bath comprises toluene (specific gravity: 0.87; coagulation value: 5.8) as the upper phase, and hydrazine hydrate (specific gravity: 1.04; coagulation value: 6.6) as the lower phase.

8. The process according to claim 1, wherein the said starting solution comprises cellulose triacetate, the coagulation bath comprises butyl acetate (specific gravity: 0.88; coagulation value: 37.4) as the upper phase, and a mixture of water and isopropyl alcohol (mixing ratio 7:3 by weight; specific gravity: 0.94; coagulation value: 4.5) as the lower phase.

9. The process according to claim 1, wherein the said starting solution comprises a polycarbonate, the coagulation bath comprises water (specific gravity: 1.00; coagulation value: 9.2) as the upper phase, and a mixture comprising equal amounts of dichloromethane and isopropanol (specific gravity: 1.06; coagulation value: 23.2) as the lower phase.

10. The process according to claim 1, wherein the said starting solution comprises a styrene-rubber copolymer, the coagulation bath comprises p-xylene (specific gravity: 0.85; coagulation value: 52.0) as the upper phase, and water (specific gravity: 1.00; coagulation value: 7.8) as the lower phase.

11. The process according to claim 1, wherein the said starting solution comprises collagen, the coagulation bath comprises methyl acetate (specific gravity: 0.94; coagulation value: 44.7) as the upper phase, and an aqueous solution of 0.5 weight percent of sodium chloride (specific gravity: 1.02; coagulation value: 6.6) as the lower phase.

12. The process according to claim 1, wherein the said starting solution comprises a polyamide, the coagulation bath comprises methyl acetate (specific gravity: 0.93; coagulation value: 30.3) as the upper phase, and hydrated hydrazine (specific gravity: 1.04; coagulation value: 6.6) as the lower phase.

13. The process according to claim 1, wherein (A) $G_2 > G_1 \geqq G_O$ when $P_1 \leqq 20 \leqq P_2$.

14. The process according to claim 1, wherein (B) $G_O \geqq G_2 > G_1$ when $P_2 \leqq 20 \leqq P_1$.

15. The process according to claim 1, wherein (C) $G_2 \geqq G_0 \geqq G_1$ when $P_1 \leqq 20 \leqq P_2$.

16. The process according to claim 1, wherein the resulting film is maintained in the interface area.

17. The process according to claim 1, wherein the said starting solution spreads in the interface area.

18. The process according to claim 1, wherein the said starting solution is selected from the group consisting of a cellulose sodium xanthogenate, a cellulose acetate, a polyacrylonitrile, a polyvinyl alcohol, a polyvinyl chloride, a polyurethane, a soy casein, a milk casein, a yeast protein, poly(L-glutamate-γ-methyl), poly(L-sodium glutamate), a synthetic graft-polymer, a block copolymer, and mixtures thereof.

* * * * *

UNITED STATES PATENT AND TRADEMARK OFFICE
CERTIFICATE OF CORRECTION

PATENT NO. : 4,102,959
DATED : July 25, 1978
INVENTOR(S) : JUNICHIRO MAEHARA

It is certified that error appears in the above-identified patent and that said Letters Patent are hereby corrected as shown below:

Column 3, line 52 - replace "(A) $G_2 < G_1 \geqq G_0$" with

-- (A) $G_2 > G_1 \geqq G_0$ -- .

Column 4, line 5 - replace "$\leqq$" with -- $\geqq$ -- .

Column 4, line 33 - replace "$\leqq 30$" with -- $\geqq 30$ -- .

Column 9, line 27 - after "prepared." insert the following which is the beginning of a new paragraph ---Film was formed by using two liquid phases of a--- .

Signed and Sealed this

Second Day of October 1979

[SEAL]

Attest:

RUTH C. MASON
Attesting Officer

LUTRELLE F. PARKER
Acting Commissioner of Patents and Trademarks